United States Patent Office 3,408,240
Patented Oct. 29, 1968

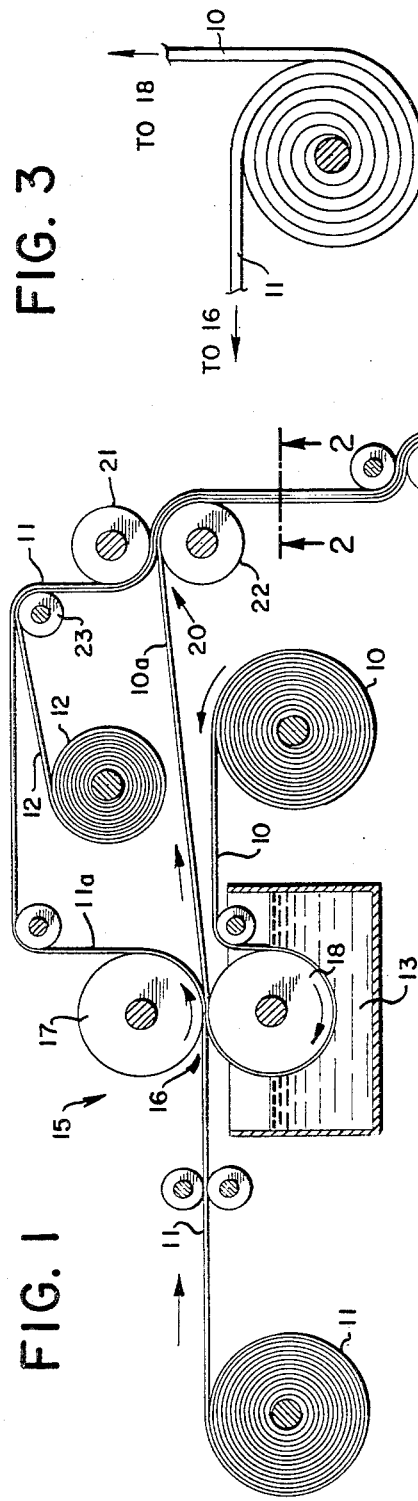

3,408,240
DOUBLE LAMINATING PROCESS USING A SINGLE WAXING STATION
Richard H. Williams, Kintnersville, Pa., assignor to Riegel Paper Corporation, New York, N.Y., a corporation of Delaware
Filed May 20, 1965, Ser. No. 457,381
12 Claims. (Cl. 156—152)

ABSTRACT OF THE DISCLOSURE

A process for the continuous production of a triplex laminate utilizing a single laminant coating station. Laminant is initially applied to one side of one web, and subsequently a substantial portion of this laminant is continuously transferred to another web by contacting the two webs under pressure and subsequently separating them before the laminant sets. The central ply web is then inserted between the coated surfaces of these separated webs and a triplex laminate is thereafter formed under heat and pressure.

---

The present invention relates to laminating processes and, more particularly, to an improved method of forming a glassine-metal foil-glassine laminate and the like in which only a single waxing station is employed.

Heretofore, it has been conventional to form triplex laminates of glassine-foil-glassine and the like, which are strong, moisture-proof materials having great utility in the packaging arts, by using a pair of waxers to apply wax coatings or similar laminating agents to the glassine plies constituting the outer layers of the laminate. The separately coated glassine plies are then sandwiched about an intermediate center ply, typically a metal foil, at a laminating nip. This method is relatively expensive and improvements thereupon have been sought. While it has been proposed to apply a double coating of the intermediate metal foil in lieu of the more expensive procedure employing separate waxers for coating each of the glassine plies, such a method has not proved feasible, since the foil or sandwiched center ply tends to wrinkle when coated with hot wax.

Accordingly, it is a major object of the present invention to provide a simplified and more economical process of manufacturing a triplex laminate than has heretofore been available. In accordance with the invention, a new and improved method of forming a triplex laminate, for example, glassine-foil-glassine, may be carried out in a highly economical manner using only one waxer instead of the conventional two waxers. Specifically, the outer glassine plies of the ultimate triplex laminate are momentarily contacted with one another in a single waxer. Shortly thereafter, before the bonding agent has set, the webs are separated, leaving a coating of laminant on each of the webs. The triplex laminate is then completed by introducing a central ply between the opposed coated surfaces of the outer glassine plies and combining the three webs together under heat and pressure in a laminating nip.

The present invention, although being deceptively simple, provides a substantial increase in efficiency and a resultant significant savings in cost in comparison with the conventional methods heretofore employed in the manufacture of triplex glassine laminates. For a more complete understanding of the invention and its attendant advantages, reference should be had to the accompanying drawing in which:

FIG. 1 is a schematic representation of the new and improved process for forming a triplex waxed lamination using only a single waxer, in accordance with the principles of the invention;

FIG. 2 is an enlarged, cross-sectional view of a laminate produced by the inventive method; and FIG. 3 is a representation of a single roll for supplying both outer webs of the triplex lamination.

With reference to FIG. 1 of the drawing, the laminated packaging material is manufactured by initially supplying two separate rolls of glassine 10, 11, having basis weights of 15–50 pounds per ream (3,000 square feet) and a roll 12 of metal foil, polyethylene, polypropylene or paper having a caliper on the order of .0002–.0010 inch. To reduce any tendencies of the finished laminate to curl, the glassine webs 10, 11 may be supplied in the form of a single roll, as illustrated in FIG. 3, on which the webs 10, 11 have been wound in face-to-face contact and then preconditioned for at least 24 hours, in accordance with the principles set forth in greater length in copending application Ser. No. 448,073, filed Apr. 14, 1965.

In accordance with an important aspect of the invention, the glassine webs 10, 11 are temporarily contacted in a single waxer indicated generally by reference numeral 15. Specifically, the web 10 is directed through a molten laminating composition 13 maintained generally at temperatures ranging from 165° F. to 215° F. where its inner face 10a is heavily coated with the composition 13 in weights of approximately 10–30 pounds per ream.

Advantageously, the laminating composition is a formulation consisting predominantly of microcrystalline petroleum wax, Butyl rubber, resin and plasticizer. One satisfactory laminating composition is made up of about 83% of amorphous wax, about 12% of polymerized rosin ("polypale resin," Hercules) about 3% of a heavy viscous liquid polybutene (polybutene No. 64, Standard Oil Co. of New York) and about 2% of Butyl rubber. For more details of this and other suitable laminating compositions, further reference may be had to the Borden et al. United States Patent No. 2,610,939. Where found necessary or desirable, certain substitutions for the microcrystalline wax, resin and other components or other adjustments of the bonding formulation may be made to reduce the temperature of the molten bath below the 165° F. minimum.

As shown, the inner face 10a of the glassine web 10 is then contacted with the inner face 11a of the glassine web 11 in a waxing nip 16 formed by the opposed rolls 17, 18 of the single waxer 15. Thereafter and without delay, in order to prevent the setting of the bonding formulation, the glassine webs 10, 11 are separated leaving a softened "offset" coating of laminating composition 13 on the inner face 11a of the glassine web 11, and leaving a substantially equal weight coat of the laminating composition 13 on the inner face 10a of the glassine web 10. Thus, the weights of composition 13 on the faces of the glassine will be approximately 5–15 pounds per ream.

After having been waxed, the glassine webs 10, 11 are directed in divergent paths toward a laminating or combining nip 20 formed by a pair of heated laminating rolls 21, 22. At this stage in the process, the center ply material, typically metal foil, is introduced between the opposed coated inner faces 10a, 11a of the glassine. More specifically, the inner coated face 11a of the glassine web 11 is directed into adherent contact with the foil 12 which is also directed toward the laminating nip, while both webs are directly supported by the surface of a roll 23.

At the combining nip 20 the adhered glassine and foil webs 11, 12 are permanently united with the coated inner face of the other glassine web 10 under predetermined heat and pressure sufficient to form the glassine-foil-glassine laminate. The temperature at the laminating nip is maintained generally slightly higher than the melting point of the wax laminant employed in the waxer. Accordingly, for formulations corresponding to those described hereinabove, the temperature would range from a minimum of approximately 175° F. to a maximum, empirically determined temperature at which the laminant tends to be extruded from between the plies 10–12 of the laminate. The speed at which the plies are combined will determine to some extent the permissible upper limits of the temperature of the laminating rolls 21, 22.

Thereafter, the triplex laminate may be conventionally fed about a series of chill rolls 24 before being wound upon a takeup roll 25.

As shown in FIG. 2, a typical triplex laminate manufactured by the new method includes outer glassine plies 10, 11, having weights of from 15 to 50 pounds per ream (3,000 square feet), and an intermediate ply 12, which is typically a metal foil having a thickness of from .0002 inch to .0010 inch. Alternatively, central plies of polyethylene, polypropylene and paper have been successfully substituted for foil in the practice of the invention. Layers 13 of a suitable laminating composition, present in amounts of approximately 5–15 pounds per ream, bond the strata of the laminate together as shown.

It will be appreciated that practice of the present invention, by eliminating the heretofore necessary requirement for two waxers, substantially reduces the capital expenditures required to establish a triplex glassine laminating operation in a paper mill. Moreover, existing conventional triplex laminating operations can be readily converted to practice the more efficient and highly economical methods of the present invention without undue cost.

It should be understood that the specific method herein illustrated and described is intended to be representative only, as certain changes may be made therein without departing from the clear teachings of the disclosure. Accordingly, reference should be made to the following appended claims in determining the full scope of the invention.

What I claim is:
1. A continuous method of forming a triplex laminate including outer glassine plies, comprising the steps of
  (a) supplying separate webs of glassine sheet material,
  (b) directing one of said webs through a molten bath of bonding formulation in a single waxing machine and the waxing nip of said waxing machine,
  (c) directing said other web into the waxing nip of said waxing machine whereby said webs are temporarily brought together,
  (d) continuously separating said webs prior to setting of the bonding formulation thereby providing each of said webs with a substantially equal coating of bonding formulation,
  (e) directing said separated coated glassine webs to a laminating nip with said coated faces in opposition,
  (f) supplying a web of central ply material between said opposed coated faces of said separated glassine webs, and
  (g) combining said webs and said central ply material under heat and rolling pressure in a laminating nip.
2. The method of claim 1, in which
  (a) said central ply material is a metal foil.
3. The method of claim 1, in which
  (a) said central ply material is polyethylene.
4. The method of claim 1, in which
  (a) said central ply material is polypropylene.
5. The method of claim 1, in which
  (a) said central ply material is paper.
6. The method of claim 1, in which
  (a) said glassine webs have basis weights of approximately 15–50 pounds per 3,000 square feet.
7. The method of claim 6, in which
  (a) said central ply material has a caliper of approximately .0002–.0010 inch.
8. The method of claim 1, in which
  (a) said separate webs are provided from a single double wound roll.
9. The method of claim 1, in which
  (a) said laminating composition includes microcrystalline petroleum wax, Butyl rubber, resin, and a plasticizer,
  (b) said composition is maintained at a temperature of approximately 165–215° F.
10. A continuous method of producing a triplex laminate including the steps of
  (a) supplying a first outer web of sheet material to a coating machine;
  (b) coating one side of said first web with a molten bonding formulation;
  (c) directing said first web into a pressure roller nip with the coated side facing outward;
  (d) supplying a second outer web of sheet material into said pressure roller nip whereby the coated side of said first web contacts the second web under rolling pressure;
  (e) continuously coating the contacting side of said second web with molten bonding formulation by passing said second outer web through said nip and subsequently separating said webs while the bonding formulation is still molten, thereby transferring a substantial portion of the molten bonding formulation from the first web to the second web;
  (f) supplying a third web of ply material between the bonding formulation-coated sides of said first and second webs;
  (g) laminating said first, second and third webs under heat and rolling pressure in a laminating nip.
11. The method of claim 10 further including the steps of
  (a) feeding the triplex laminate about a series of chill rolls; and
  (b) subsequently winding said triplex laminate onto a takeup roll.
12. The method of claim 1, in which step (b) is
  (a) performed to apply approximately 10–30 pounds of bonding formulation per 3,000 square feet of glassine web, whereby after step (d) each of said glassine webs has a coating of approximately 5–15 pounds per 3,000 square feet.

References Cited
UNITED STATES PATENTS

| | | | |
|---|---|---|---|
| 2,054,113 | 9/1936 | Abrams et al. | 156—324 X |
| 2,158,754 | 5/1939 | Hodgdon | 156—550 X |
| 2,434,795 | 1/1948 | Glasing et al. | 156—549 X |
| 3,068,130 | 12/1962 | Gaquin et al. | 156—324 X |
| 3,219,504 | 11/1965 | Rosler | 156—152 |

EARL M. BERGERT, *Primary Examiner.*

M. L. KATZ, *Assistant Examiner.*